Aug. 26, 1958     O. E. SORENSEN     2,849,240
COLLET HOLDER
Filed Oct. 24, 1955
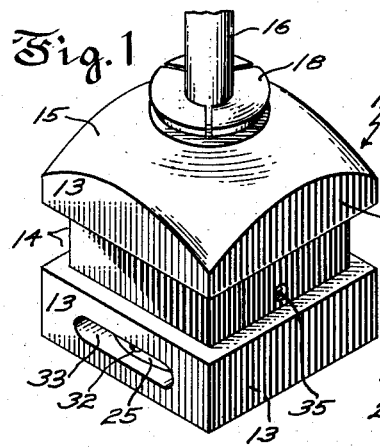
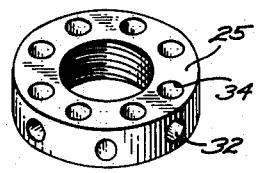
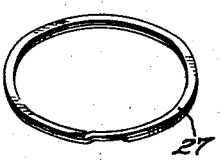
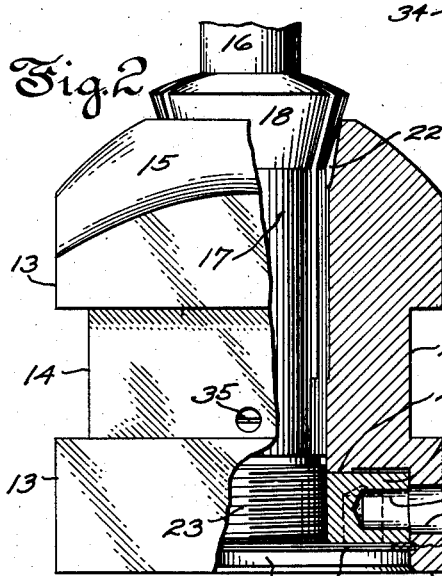
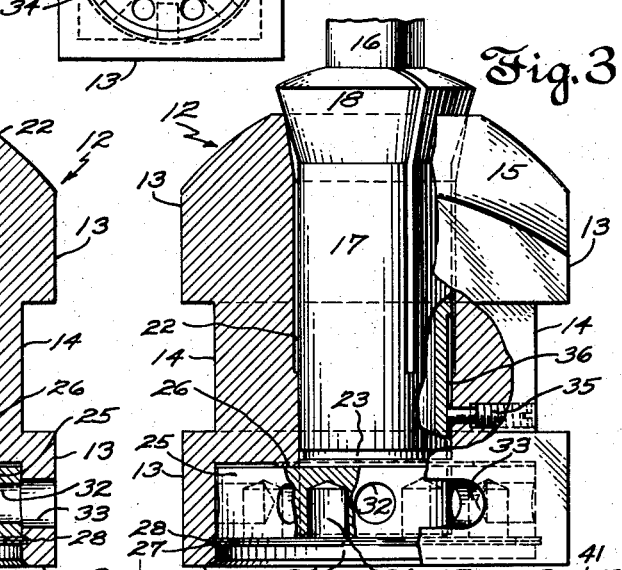
INVENTOR
Otto E. Sorensen,
BY
ATTORNEY United States Patent Office 2,849,240
Patented Aug. 26, 1958

2,849,240

COLLET HOLDER

Otto E. Sorensen, Fairfield, Conn.

Application October 24, 1955, Serial No. 542,188

4 Claims. (Cl. 279—5)

This invention relates to collet holders incorporating collet tightening and loosening structure by means of which any work piece suitable for being chucked in the collet can be supported by the holder stably in a plurality of positions while projecting from the collet at sufficient distance from a flat support surface against which the holder rests to be accessible in each of said positions for machining in a milling machine, shaper or grinder, etc. Such collet holder may also be secured to the face plate of a lathe or can itself be chucked in the spindle of a drill press or vertical boring machine. The collet holder of these improvements may also serve to support the work in various positions while the work is being measured or scribed preparatory to machining, or for testing the accuracy of a work piece after it has been machined.

Collet holders as heretofore proposed have not been capable of supporting a work piece in as many as five different parallel or perpendicularly related positions and the structure of such devices has been of outstretching, space consuming nature rather than compacted into space saving form.

An object of this invention is to provide a collet holder in the simplest possible form of structure, preferably of blocklike nature, so that its over-all dimensions are a minimum in comparison with the size of collet to be held thereby, and further of such nature that it is capable of holding a work piece in any of the aforesaid five different parallel or perpendicularly related positions.

Another object is to support the collet so that its axis can be stably held either in parallel or perpendicular relation to a flat support surface against which the block may rest or be fastened.

A further object is to enable the collet to be tightened and loosened in relation to the work piece while the collet holder remains undisturbed in any one of its said five relationships to a flat support surface.

These and more detailed aspects of the improvements will be apparent from the following description of preferred embodiments of the invention having reference to the accompanying drawings wherein:

Fig. 1 is a perspective view of a collet holder embodying the invention having a work piece lodged in and projecting from the mouth of the collet.

Fig. 2 is a view in elevation drawn in preferred actual size showing the collet holding structure partially broken away to expose a threaded draw end of the collet.

Fig. 3 is a view like Fig. 2 showing more fully the construction of the collet tightening means.

Fig. 4 is a bottom plan view of the holder of Figs. 1–3.

Fig. 5 is a perspective view of the collet tightening nut detached from the assembly of Figs. 2–4.

Fig. 6 is a perspective view of a removable thrust washer employed in the assembly of Figs. 2–4.

Fig. 7 is a bottom plan view of a modified construction of collet holder embodying the invention, wherein the base of the block is castellated to provide four corner legs on which the body of the block stands stably in one of its five optional work holding positions.

Fig. 8 is an elevation of the modified block partially broken away looking from the right at Fig. 7.

Fig. 9 is a view taken partially in section on the plane 9—9 in Fig. 8.

Referring to Figs. 1–6, inclusive, my improved collet block 12 has four or more flat sides 13 which are interrupted by a circuitous relief channel 14. The top 15 of the block is dome-shaped to give better access to a work piece 16 that projects from the mouth of the collet 17 at its conventional split conical head 18.

Block 12 contains an axially extending hollow or bore 22 that partially admits the collet head 18 in conical camming engagement therewith. Hollow 22 extends through the block from the head end of the collet to beyond the externally threaded draw end portion 23 thereof whereat the hollow is counterbored to afford a space recess 24 within the confines of block 12 occupied by the draw end 23 of the collet and also occupied by collet tightening means including a draw nut 25 having threaded engagement with the collet end portion 23 within the said recess. Nut 25 thrusts against an annular seat 26 on the body of block 12 for drawing the collet bodily downward or inward of the block in Figs. 1, 2 and 3. Nut 25 is retained against departure from seat 26 by a radially contractile ring 27 composed of more than one helical convolution of edgewise curving resilient metal strip whose periphery is lodged in a narrow annular groove 28 provided internally of the recesses bordering walls of the block. Thrust ring 27 can be inserted in and removed from groove 28 by progressively springing the curved strip of the coil edgewise and radially inward starting at the exposed free end of the strip, and is restored to its annular seat 28 in the block by merely reversing this progressive temporary distortion of the true circular shape of the coil.

Nut 25 has threaded engagement with the draw end portion 23 of the collet and is provided with eight radially directed and accessible sockets, at least two of which are at all times in register with the length of an elongate aperture 33 forming a gap in one or more of the recess bordering sides 13 of block 12 in Figs. 1 and 2. Thus sockets 32 can be engaged by a wrench when the terminal surface 37 of the block sides is resting against a support surface with the collet in perpendicular relation thereto. Nut 25 also presents at least two axially directed sockets 34 at the bottom open end of the block accessible to a spanner wrench (not shown) for turning the nut when the block is lying on any one of its four sides 13.

While nut 25 is being turned, either for tightening or loosening the hold of the collet upon the work piece 16, the collet itself is prevented from turning by the engagement of a key screw 35 that threads into a laterally directed hole in block 12 and is adjusted to fit and guidingly occupy an external key way 36 in the wall of the collet without impeding draw movement of the collet in an axial direction for clamping and releasing the work.

In use of the holder of Figs. 1–6, the end of a wrench shank (not shown) can be inserted through the aperture 33 into whatever socket 32 happens to be accessible through such aperture. The length of the aperture affords room for turning the nut 25 until an adjacent socket 32 comes into register with the aperture. Thus an unlimited degree of continuous turning of the nut can be done in stages by engaging successive sockets 32 of the radially directed group. An aperture such as 33 can be contained in each or any one of the block sides 13, thus making possible the described operation of the nut regardless of which of the block sides rest against a block supporting bed plate or face plate. When nut 25 is turned in a direction to release its tightening force on the collet it bears downward against ring 27 and thus thrusts the split head 18 upward to free it from the contracting force of the block head 15. Thereupon the resilience in the split hollow shaft of the collet causes the collet head to release the work piece 16 which thereupon can be readjusted or replaced by another work piece in usual manner ready for subsequent support of the work by the collet holder. Work pieces are tightened in the collet by reversely turning the nut 25 to draw the collet head 18 cammingly inward of the block.

Figs. 7-9, inclusive, show a collet holding block 12' of modified construction wherein the circuitous base portion of the block is replaced by four leg-like spaced apart extensions 41 of the block sides which castellate the base of the block so that the wrench sockets 32 in nut 25 are accessible from a lateral direction as readily as through the block aperture 33 in Figs. 1-6.

In Figs. 7-9 the turnable nut 25' is retained in thrust relation to a seat 26' on the body of block 12' by means of two rabbeted nut retaining track sectors 42 secured against a recessed bottom face of block 12' at opposite sides of the nut 25' by screws 43. A radially inward projecting flange 44 of each track sector 42 enters a peripheral groove 45 in nut 25' thus guiding the latter for rotation in axially stationed relation to the body of the block. Those portions of the block base between corner legs 41 which alternate with the retainer sectors 44 flank the periphery of nut 25' as shown in Fig. 8 so as as nearly to complete a circuitous journal bearing for the periphery of the nut keeping the latter centered as it turns.

The appended claims are directed to and intended to cover such variations of the construction and arrangement of parts disclosed herein as come within the scope of novelty defined by the claims.

I claim:

1. A portable work chucking device as defined in claim 2, together with an annular groove in the said sides of said block opening to the said recess at an end of the said nut remote from the said thrust receptive seat, and a contractible thrust washer having its outer periphery removably lodged in said annular groove and overlapping said nut in a manner to restrict departure of the latter from said seat.

2. A portable work chucking device comprising an axially elongate collet having a circumferentially contractible flaring head portion and a screw threaded draw-end portion with a tubular shank extending therebetween, a collet holding integral block having a bore therethrough and having at one end of said bore a tapering mouth receptive to said head portion of said collet and having at the opposite end of said bore a recess bordered by sides of said block that flank and extend beyond said draw-end portion of the collet, said block presenting at least four external flat side surfaces contained respectively in intersecting planes paralleling the axis of the collet and ending in coplanar terminal surfaces arranged about said recess on which the block is adapted to rest stably, a thrust receptive seat in said recess surrounding a portion of said collet shank adjacent said threaded end portion of the collet, and a nut confined within said recess on said draw-end portion of the collet turnable in thrust relation to said seat for drawing said collet head into said mouth of the block, said sides of the block being apertured to afford a gap exposing said nut for the application thereof of a nut turning tool when the block rests on any of the said five flat surfaces.

3. A portable work chucking device as defined in claim 2, in which the said sides of the said block include four leg-like laterally spaced apart projections forming continuations of the said block one at each corner junction of the said side surfaces with space between said leg-like projections providing the said gap for giving access to the said nut.

4. A portable work chucking device as defined in claim 3, together with an annular groove in the peripheral surface of the said nut, and a plurality of retainer track sectors removably secured to the said block each having a flange projecting into said annular groove in the nut with such fit that the nut is free to turn while retained by said track sectors against departure from the said thrust receptive seat.

References Cited in the file of this patent

UNITED STATES PATENTS

| | | |
|---|---|---|
| 1,923,967 | Brown | Aug. 22, 1933 |
| 2,194,089 | Johnson | Mar. 19, 1940 |
| 2,450,931 | Bault | Oct. 12, 1948 |
| 2,520,518 | Thompson | Aug. 29, 1950 |
| 2,585,594 | Snyder | Feb. 12, 1952 |